United States Patent
Shiomoto et al.

(10) Patent No.: US 6,324,175 B1
(45) Date of Patent: Nov. 27, 2001

(54) CIRCUIT-SWITCHED NETWORK

(75) Inventors: Kohei Shiomoto; Naoaki Yamanaka, both of Tokyo (JP)

(73) Assignee: Nippon Telegraph and Telephone Corporation, Shinjuku-ku (JP)

(*) Notice: Subject to any disclaimer, the term of this patent is extended or adjusted under 35 U.S.C. 154(b) by 0 days.

(21) Appl. No.: 09/205,612

(22) Filed: Dec. 4, 1998

(30) Foreign Application Priority Data

| Dec. 4, 1997 | (JP) | 9-334444 |
|---|---|---|
| Dec. 8, 1997 | (JP) | 9-337205 |
| Dec. 15, 1997 | (JP) | 9-345242 |
| Dec. 19, 1997 | (JP) | 9-351431 |

(51) Int. Cl.[7] .................................................. D04H 1/00

(52) U.S. Cl. ......................... 370/357; 370/355; 370/351; 370/400

(58) Field of Search ..................... 370/357, 373, 370/376, 384, 385, 400, 305, 388, 522, 420, 355, 524, 351, 438, 352, 446, 473, 474, 498

(56) References Cited

U.S. PATENT DOCUMENTS

| 4,512,015 | * | 4/1985 | Kano | 370/366 |
|---|---|---|---|---|
| 4,736,364 | * | 4/1988 | Basso | 370/420 |
| 5,347,513 | | 9/1994 | Abefelt et al. | |
| 5,408,468 | * | 4/1995 | Petersen | 370/377 |
| 5,430,717 | * | 7/1995 | Fowler | 370/384 |
| 5,673,262 | * | 9/1997 | Shimizu | 370/395 |

FOREIGN PATENT DOCUMENTS

| 0 372 283 | 6/1990 | (EP) . |
|---|---|---|
| 93/25026 | 12/1993 | (WO) . |

OTHER PUBLICATIONS

Burst Switching–An Update, Stanford R. Amstutz, Sep. 1989 —IEEE Communications Magazine, pp. 50–57.

Fast Circuit Switching for the Next Generation of High Performance Networks, Christer Bohm et al, 1996 IEEE, vol. 14,No.,2 Feb.1996, pp. 298–305.

Technical Report of IEICE.DTM: Dynamic Transfer Mode, N.Yamanaka et al, pp. 19–24.

IEEE Transactions on Communications, vol.Com–30, No.4, Apr. 1982, TASI–E Communications System, Robert L. Easton et al 1982 IEEE, pp. 803–808.

Performance Analysis of Dynamic Flow Setup in ATM Networks, Kohei shiomoto et al, 1998 IEEE, pp. 578–583.

IEICE Transactions on Communications, vol. E81–B, No. 5, May 1998 pp. 1004–1015.

Proceedings of the 1998 IEICE General Conference, Mar. 27–30 1998, Tokai University, Hiratsuka (4 Pages).

Van Baardewijk, J., "An Experimental All–In–One Multi-service Broadboard Switch", Innovations in Switching Technology, Phoenix, Arizona, Mar. 15–20, 1987, vol. Part. 3, No. SYMP. 1987, Mar. 15, 1987, pp. 779–783, XP000302523 Institute of Electrical and Electronics Engineers.

Takao Takeuchi et al., "Synchronous Composite Packet Switching A Switching Architecture for Broadband ISDN" IEEE Journal on Selected Areas in Communications, vol. SAC–5, No. 8, Oct. 1, 1987, pp. 1365–1376, XP000313596.

(List continued on next page.)

*Primary Examiner*—Douglas Olms
*Assistant Examiner*—Ricardo Pizarro
(74) *Attorney, Agent, or Firm*—Pillsbury Winthrop LLP

(57) ABSTRACT

In an STM network, burst data which has been given a logical address is transferred using time slots allocated to the physical address of the destination, this physical address corresponding to the logical address. This enables data to be communicated over the STM network using logical addresses.

16 Claims, 17 Drawing Sheets

OTHER PUBLICATIONS

Yamanaka et al., (Japanese Title) "DTM: Proposal of Dynamic Transfer Mode, (English Title) "DTM: Dynamic Transfer Mode based on Short Holeded Circuit Switching Technique, The Institute of Electronics, Information and Communication Engineers; General Convention 1998, Mar. 27–30, 1998, pp. 1–3.

Shiomoto et al., "Performance analysis of burst transfer delay in Dynamic Transfer Mode networks", The Institute of Electronics Information and Communication Engineers; General Convention 1998, pp. 1–5.

* cited by examiner

| E.164 Route | Time Slot No. |
|---|---|
| Route # 1 | # 4 |
| Route # 2 | # 2 |

CIRCUIT-SWITCHED NETWORK

BACKGROUND OF THE INVENTION

This application claims priority from Japanese Patent Applications No. 9-334444 filed Dec. 4, 1997 in Japan, No. 9-337205 filed Dec. 8, 1997 in Japan, No. 9-345242 filed Dec. 15, 1997 in Japan and No. 9-351431 filed Dec. 19, 1997 in Japan, the contents of all four applications being incorporated herewith by reference.

1. Field of the Invention

The present invention relates to Synchronous Transfer Mode (STM) communications networks, and in particular to techniques for transferring data with an Internet Protocol (IP) address by way of an STM connection.

2. Description of Related Art

A characteristic of STM-based circuit-switched networks is that because a signal on a physical channel is multiplexed into time slots and circuit-switched, the delay during communication is extremely short and there is no overhead such as the header required in Asynchronous Transfer Mode (ATM) where virtual paths and cells are employed. In telephones, for example, voice quality problems arise and echo cancelers may be required if there is a delay of more than 20–30 ms. In telephones, video conferencing and other bidirectional services in general, it is preferable for delay to be short. From this point of view, STM is a transport mode which is well suited to digital telephone networks.

The operation of a conventional STM network will be explained with reference to FIG. 1 and FIG. 2. FIG. 1 shows the main components of a conventional STM-based circuit-switched network, while FIG. 2 shows the main components of a conventional local switch.

As shown in FIG. 1, in a conventional STM-based circuit5 switched network, a user operating telephone 11 transmits dialing information 15 (the telephone number of the called party) to source switch 13 in STM network 12 via common channel signaling network 16. This is signaling system No. 7 as defined in ITU-T recommendations. Switch 13 receives the dialing information via software 14 and maps it to an E.164 address (an ISDN address as standardized by the ITU-T) for physical transmission, whereupon STM-based communication is carried out. Namely, source switch 13 establishes an STM connection in STM network 12 and uses this connection to map data from telephone 11 to the E.164 address and transfer it to destination switch 13.

In a conventional STM-based circuit-switched network of this sort, switching is performed by transposing time slots which have been multiplexed into frames, each time slot comprising 8 bytes of data. By way of example, this operation can be implemented by a sequential write random read, as shown in FIG. 2. Namely, time slots can be switched by using sequential counter CTR to write the data at sequential addresses to data buffer memory DBM, and then using address control memory ACM to change the order in which this data is read.

As mentioned above, compared with ATM and the like, the advantages of a conventional STM-based circuit-switched network of this sort are that delay is extremely short and there is no overhead.

However, a conventional STM-based circuit-switched network of this sort requires that data is transferred via an STM connection which has been set up in advance from a source user terminal to a destination user terminal. Its applicability is therefore restricted, and such circuit-switched networks are only being considered for leased data circuits between large businesses. FIG. 3 illustrates a schematic of a dedicated STM connection.

On the other hand, in data communications based on an IP architecture, by writing the IP address, which is the identification number of a terminal, in the header of a packet and sending this to a network such as the Internet which supports IP, each router of a switch or the like simply looks for the immediate transfer destination corresponding to the address. The datagram is successively transferred without requiring a connection to be set up between the two terminals which want to communicate. Thus no dedicated connection is required and data can be transferred by means of an extremely simple procedure. However, under this scheme there is a longer delay than in an STM-based circuit-switched network, and overhead is necessary.

SUMMARY OF THE INVENTION

It has been an intention of the inventors to construct a novel circuit-switched network which combines the advantages of an STM-based circuit-switched network and the advantages of data communications based on IP addresses.

It is therefore an object of the present invention to offer a circuit-switched network capable of providing STM circuits dynamically. This is a service which previously could only be offered for simple leased lines by providing an STM-based trunk network based on the logical addresses, and in particular the IP addresses, used in data communications. It is a further object of this invention to provide a circuit-switched network in which delay and overhead requirements are slight.

One characteristic of the present invention is that it analyzes logical addresses in an STM network and performs routing on a burst-by-burst basis on the basis of these logical addresses. One significant feature of the present invention relates to how connections are created and used, and the procedure whereby a user requests a connection.

Namely, a circuit-switched network according to this invention comprises, in an STM network, a plurality of local switches each serving at least one terminal and at least one transit switch connected between these local switches. Logical addresses, and in particular IP addresses, for sending and receiving burst data (packets) between the terminals of these local switches are allocated to at least some of these terminals. Each of the local switches comprises: means for receiving burst data which has been given a logical address and which arrives from a terminal served by that switch; means for managing the logical addresses of the terminals served by that switch; means for acquiring time slot information (the time-slot-relay, i.e., information relating to the route to the destination local switch) which has been allocated in respect of the STM network to the local switch which serves the terminal constituting the destination of this burst data, this allocation being carried out in accordance with the logical address of the received burst data; and means for transferring the burst data through the STM network in accordance with the time slot information obtained by the acquisition means.

The aforesaid acquisition means can comprise means for transferring information relating to the logical address of the received burst data to another local switch. The acquisition means also may comprise means which, if it receives logical address information from another local switch and the logical address concerned is a logical address managed by the local switch to which the acquisition means belongs, returns the time slot information allocated to this local switch to the local switch which is the source of that logical address information.

Alternatively, STM connections can be set up in advance between the aforesaid plurality of local switches, and a table, in which is recorded the time slot information corresponding to these STM connections, can be provided. The aforesaid acquisition means can comprise means for acquiring the aforesaid time slot information by looking up information from this table. In this case, because the time required to transfer logical address information to other local switches is eliminated, time slot information can be obtained rapidly.

If such a table is provided, each local switch can comprise means for monitoring, for each STM connection, whether that connection is busy or not, and for releasing an STM connection which has not been used for more than a set time. As a result, if one of the STM connections which have been set up in advance has not been used for a long period of time, this connection can be released, whereby effective utilization of network resources can be achieved.

Each local switch can comprise: table means in which is recorded, for at least some of the terminals for which logical addresses have been allocated for sending and receiving burst data within the STM network, the correspondence between the logical addresses of these terminals and the physical addresses allocated in advance to these terminals for purposes of routing in the STM network, or the information relating to routes to these terminals. Each local switch can further comprise means which, when it receives, from a terminal served by the local switch to which the means belongs, burst data to which the logical address of a destination has been given, reads from the aforesaid table means the physical address corresponding to this logical address and adds it to the header of the aforesaid burst data; and means which refers to this added header and transfers the burst data to the STM network in time slots corresponding to the physical address.

In other words, a packet in which a logical address (an IP address) has been written is transferred through the STM network to the desired destination terminal by adding to the packet a header in which has been written a physical address (an E.164 address) indicating the local switch serving the terminal indicated by said logical address. During this process, the transit switches verify the header of the arrived packet and relocate the packet in the prescribed time slots. Accordingly, dedicated connections are not set up in advance in the STM network. Instead, each time a switch receives a packet it determines the time slots in which it will place that packet at that point in time. Thus, data can be transferred on a link-by-link basis as simply and easily as in data communications based on the IP architecture mentioned above.

A transit switch preferably comprises means for referring to the header of the burst data written in time slots and for reading its physical address, and means for relocating, in accordance with the read physical address or routing information, the burst data in time slots corresponding to this physical address.

A transit switch also preferably comprises means which, if there are no free time slots corresponding to the aforesaid read physical address, temporarily stores the burst data until such free time slots are available.

Further, the aforesaid STM network preferably comprises a database in which is recorded the logical address of each terminal and the physical address corresponding to this; and each local switch preferably comprises means which, when burst data arrives bearing a logical address which is not recorded in the table means of that local switch, queries the aforesaid database for the physical address corresponding to this logical address.

Namely, when a local switch retrieves a physical address in the STM network corresponding to a given logical address, it first refers to the table provided within itself and retrieves the physical address corresponding to that logical address. If it is unable to retrieve a physical address from the table, it queries the database.

If the database finds a physical address corresponding to the logical address, it replies to the local switch with the data which has been retrieved. The local switch then records this retrieved data in its table. If the local switch does not have spare capacity in its table and cannot record the retrieved data, it preferably replaces the oldest data recorded in the table means with the retrieved data. The usefulness of the table is thus increased by recording physical addresses corresponding to frequently used logical addresses.

Rapid retrieval can be achieved by constituting the table and the database from associative storage memory.

When burst data containing voice multiplexed signals is transferred through an STM network, the voice information can be transferred with a shorter delay than experienced in data communications based on a general IP architecture. However, if a common channel signaling network is used for control and the time required to set up STM connections in advance is taken into consideration, then transferring IP packets over a conventional STM network without modification may result in unacceptable delay. To overcome this problem, it is preferable to allocate some of the time slots of each frame, a frame being the unit of data transfer in an STM network on a fixed basis for transferring control information containing signals for establishing STM connections.

Namely, it is preferable if each local switch and each transit switch comprises insertion means which takes prescribed time slots as the control channel and inserts control information in these time slots, extraction means for extracting control information from these time slots, and control means for performing connection control in accordance with the extracted control information.

In order to operate as a switch which serves source terminals, each local switch preferably comprises means for receiving a connection request arriving from a terminal which the switch serves, and for deciding the destination of the connection requested by that terminal, plus means for forming and setting in the aforesaid control means control information for connecting this terminal to the destination decided by the decision means. The control means preferably comprises means for performing its own connection control and for selecting the next switch in accordance with the control information which has been set by the aforesaid setting means. The aforesaid insertion means preferably comprises means which, when the switch to which it belongs is a source, inserts the aforesaid set control information in the aforesaid prescribed time slots, thereby transferring it to the selected next switch.

In order to operate as a switch which serves destination terminals, each local switch preferably comprises means which, when the aforesaid extraction means has extracted control information which has been transferred from a source side local switch, performs its own connection control in accordance with this control information.

Each transit switch preferably comprises means for performing its own connection control and for selecting the next switch in accordance with control information which has been extracted by its extraction means; and the insertion means of each transit switch preferably comprises means for inserting said control information in the aforesaid prescribed time slots and thereby transferring it to the selected next switch.

By using prescribed time slots as the control channel, the advantage of STM (e.g., little delay) is put to even better use, thereby permitting efficient transfer of voice information.

Using prescribed time slots as the control channel can also be implemented separately from analyzing the logical addresses and performing burst-by-burst routing Namely, according to this aspect, the present invention provides a circuit-switched network comprising switches which include control units which perform connection control by changing the positions of time slots carrying time division multiplexed data, wherein prescribed time slots are allocated on a fixed basis as control channels between the aforesaid switches, and each of these switches comprises insertion means for inserting control information in the prescribed time slots and extraction means for extracting the control information from these prescribed time slots and setting it in the aforesaid control unit.

BRIEF DESCRIPTION OF THE DRAWINGS

Embodiments of the present invention will now be described with reference to the accompanying drawings, of which:

FIG. 7 shows an example of a routing table;

DETAILED DESCRIPTION OF THE PREFERRED EMBODIMENTS

An embodiment of the present invention will be explained with reference to FIG. 4 and FIG. 5.

Figure 4:
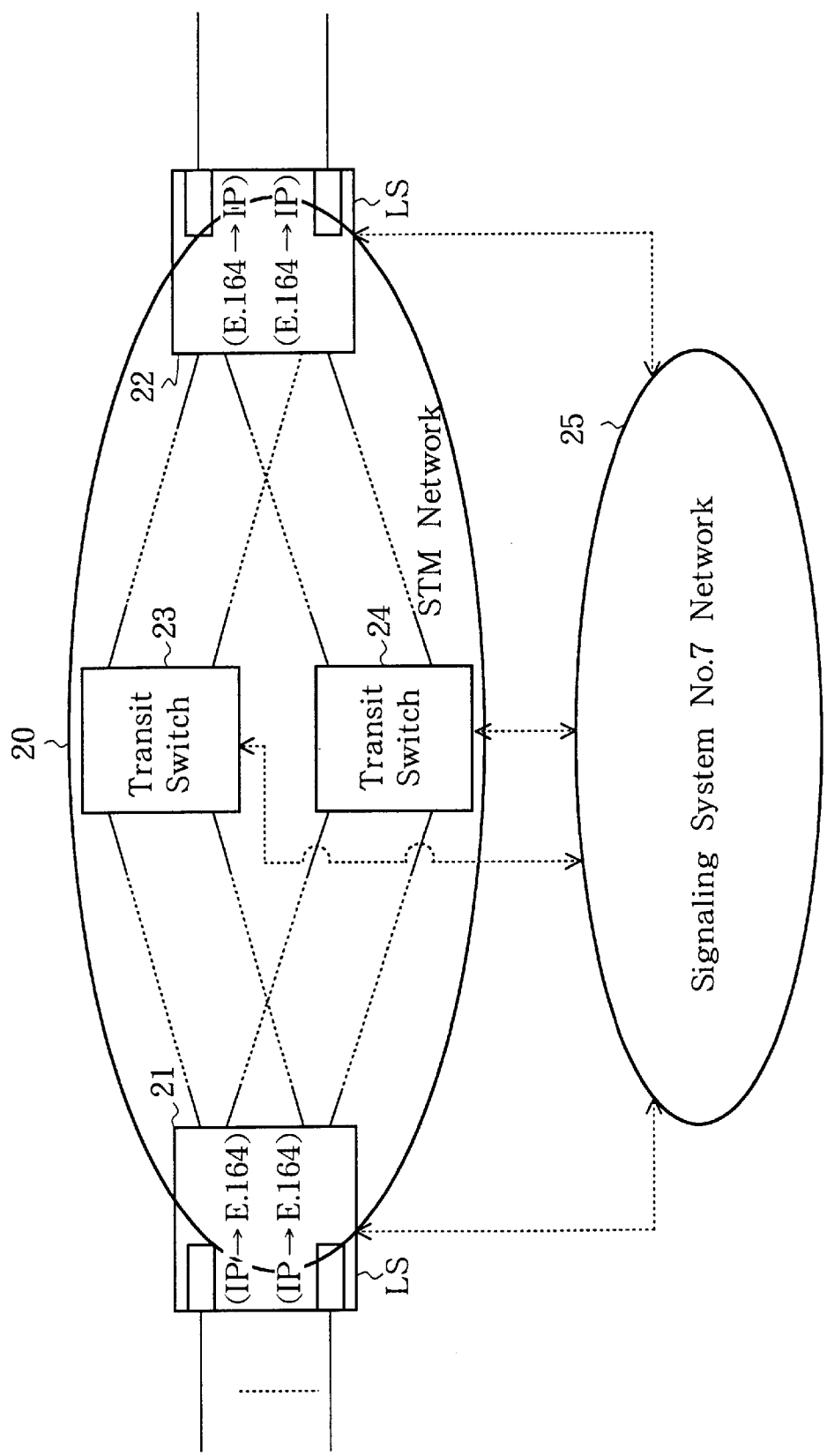
FIG. 4 is a block diagram of a circuit-switched network according to an embodiment of the present invention.

As shown in FIG. 4, a circuit-switched network according to this embodiment comprises, in STM network 20, a plurality of local switches 21 and 22 which serve at least one terminal, 25 and transit switches 23 and 24 connected between these local switches 21 and 22. There is also provided a ITU-T recommended signaling system No.7 network 25 for transferring control information among local switches 21 and 22 and transit switches 23 and 24, this control information comprising signals for establishing STM connections.

Figure 5:
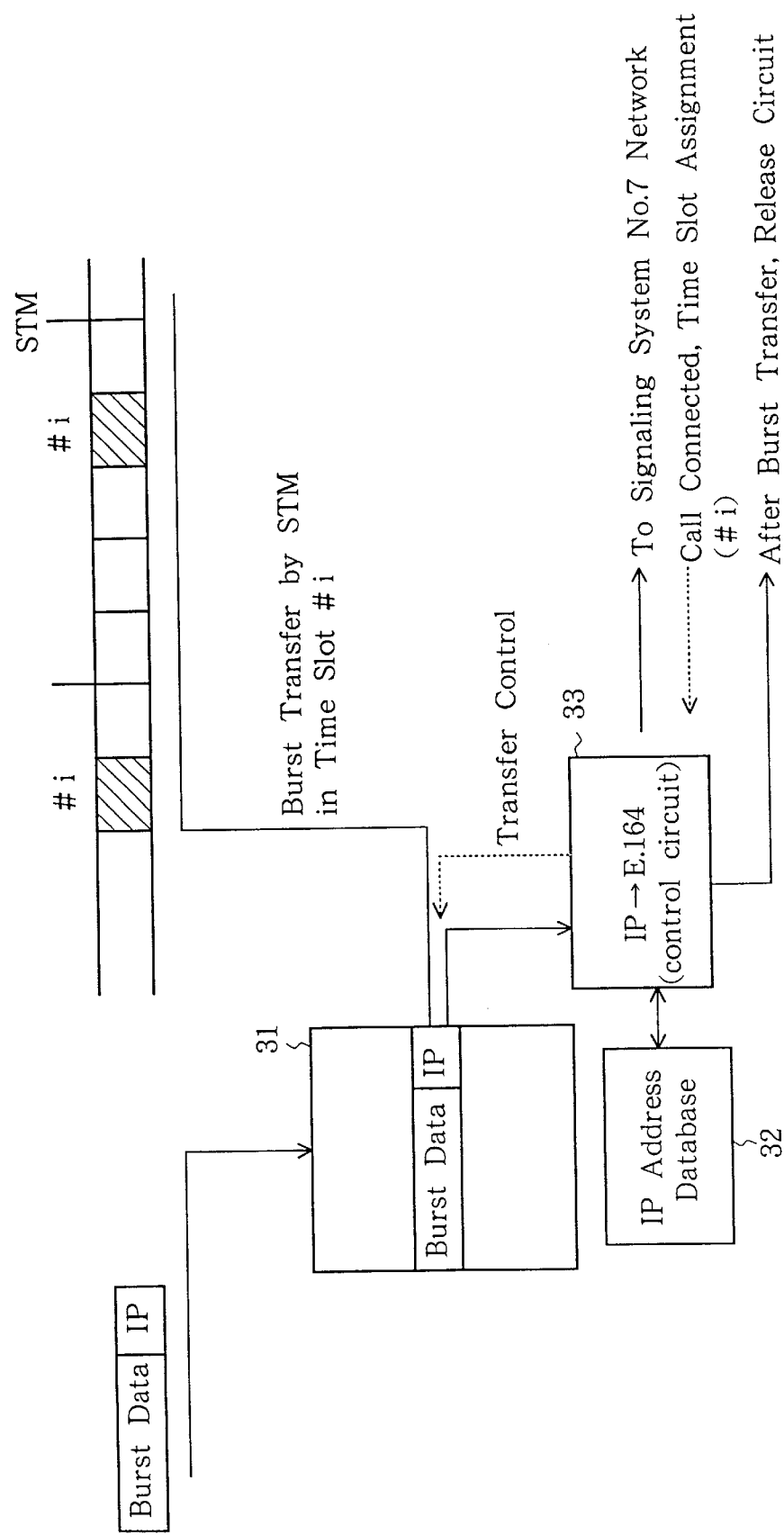
FIG. 5 is an exemplary block diagram of a local switch according to this embodiment.

A significant feature of this embodiment is that local switches 21 and 22 comprise, as shown in FIG. 5, burst data store 31 for receiving burst data with an IP address, the burst data arriving from a terminal; IP address database 32 for managing the IP addresses of the terminals served by the local switch; and control circuit 33 for acquiring time slot information which has been allocated to the local switch which serves the terminal constituting the destination of the burst data, this allocation being carried out in accordance with the IP address of the received burst data. This control circuit 33 transfers the burst data through the STM network in accordance with the time slot information which has been obtained.

The operation of this embodiment will now be described in greater detail. Control circuit 33 transfers the IP address of the arrived burst data to another local switch by way of the signaling system No.7 network. The control circuit of the local switch which receives this IP address refers to IP address database DB in its local switch, and if that IP address is an IP address managed by that local switch, it sends the time-slot-relay, i.e., the routing information, which has been allocated to itself, in reply to the local switch which transmitted the IP address the reply being sent via the signaling system No.7 network. Control circuit 33 can thereby acquire the time slot information which has been allocated to the local switch which serves the terminal constituting the destination of the burst data, and uses these time slots to transfer the burst data stored in burst data store 31. After the burst data has been transferred, the allocated time slots are released.

In order to obtain time slot information, rather than transferring IP addresses one-by-one to other local switches, it is also feasible to read them from a pre-recorded table. An example of this sort will be described with reference to FIG. 6 and FIG. 7.

Figure 6:
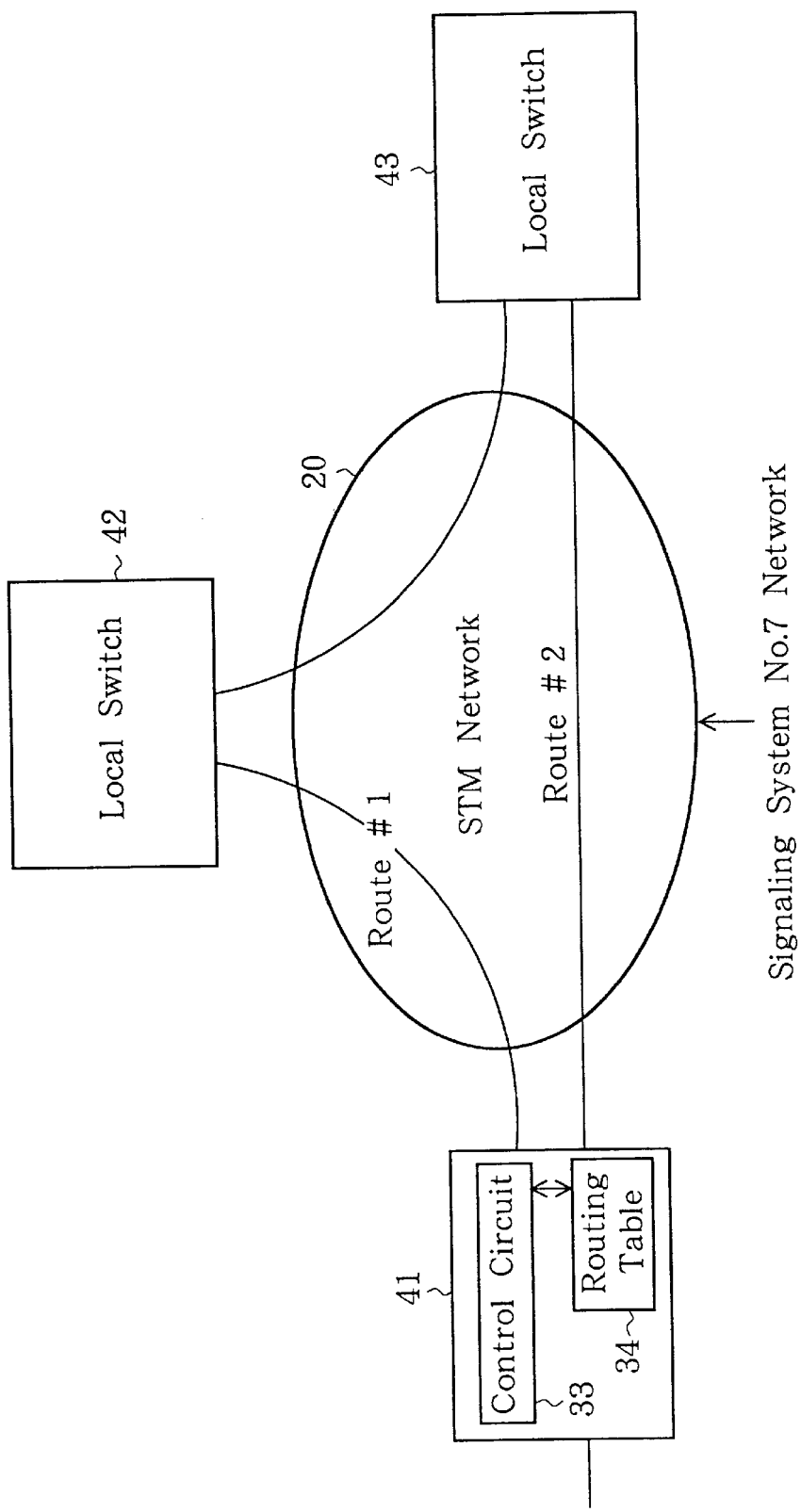
FIG. 6 serves to explain a routing table and shows an example of setting up a route.
Figure 7:
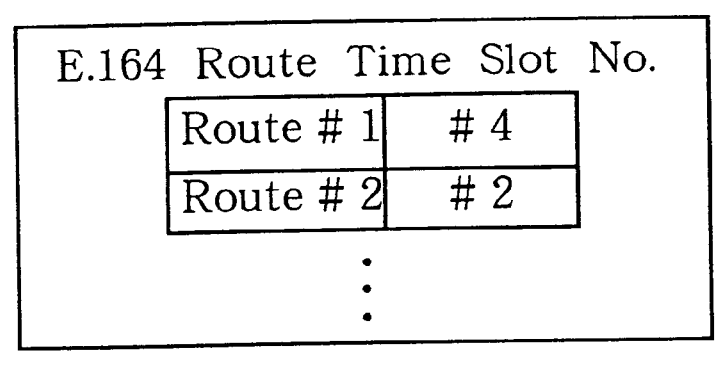

In the example illustrated in FIG. 6, routes #1 and #2, which are STM connections, are set up in advance, route #1 being between local switch 41 and local switch 42, and route #2 being between local switch 41 and local switch 43. Local switch 41 comprises control circuit 33 and routing table 34, and as shown in FIG. 7, time slot information corresponding to routes #1 and #2 is recorded in routing table 34. Control circuit 33 acquires time slot information by looking up this information from routing table 34. Because an information transfer procedure of the sort exemplified in FIG. 5 for acquiring time slot information is omitted, the time slot information required for communicating with the destination local switch can be obtained rapidly.

It is also possible to monitor, at each local switch, whether the routes are busy or not, and to release a route which has not been used for more than a set time. An example of such a configuration is illustrated in FIG. 8.

Figure 8:
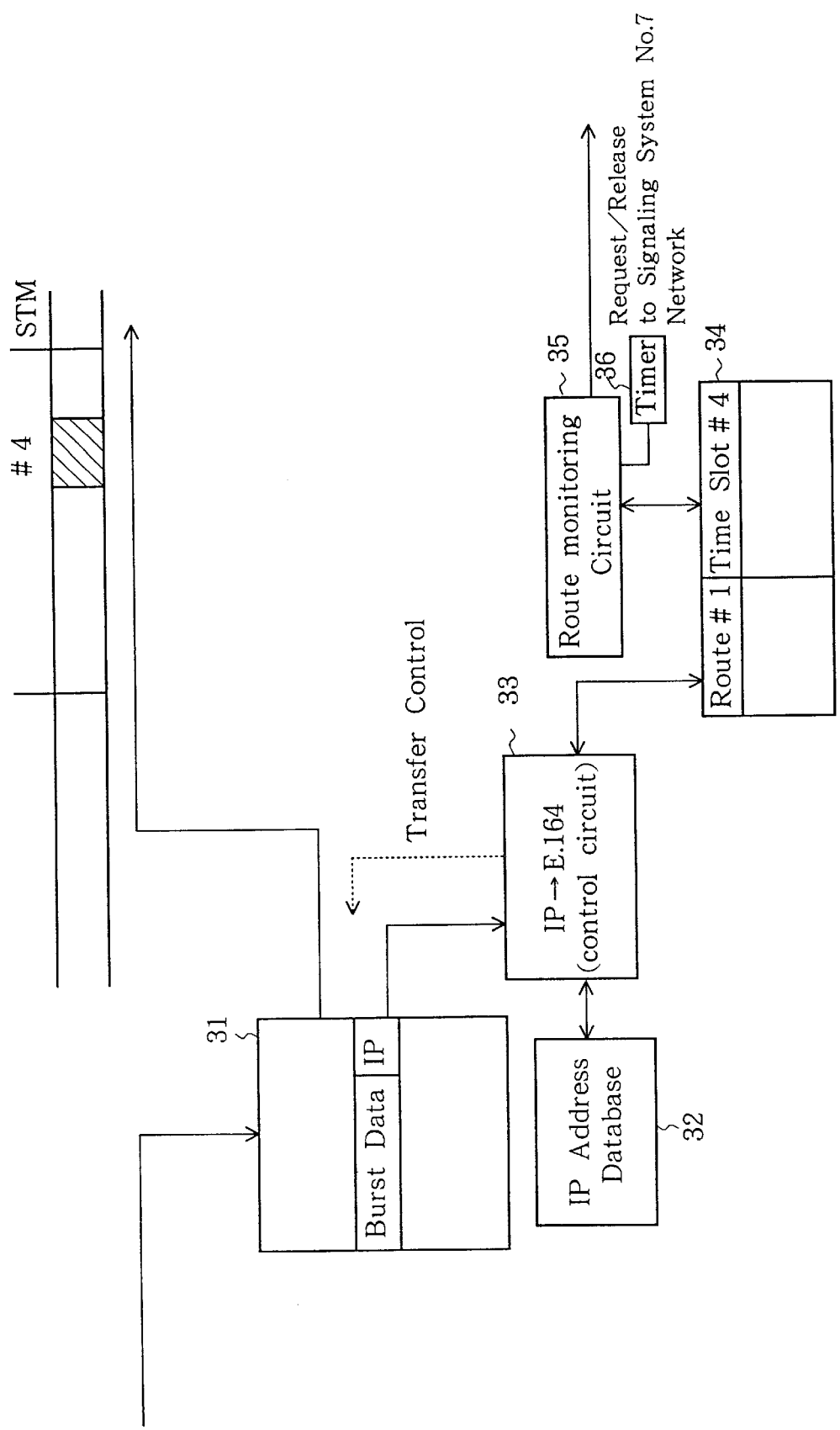
FIG. 8 is another exemplary block diagram of a local switch.

The local switch illustrated in FIG. 8 comprises, in addition to burst data store 31, IP address database 32, control circuit 33 and routing table 34, route monitoring circuit 35 which monitors the routes recorded in routing table 34, and timer 36. If among the routes which have been set up in advance there is a route which has not been used for more than a prescribed time which has been set in timer 36, route monitoring circuit 35 sends a signal requesting release of this route to the signaling system No.7 network, whereby that route to the other switch is released. Efficient utilization of network resources can be achieved in this manner.

Figure 9:
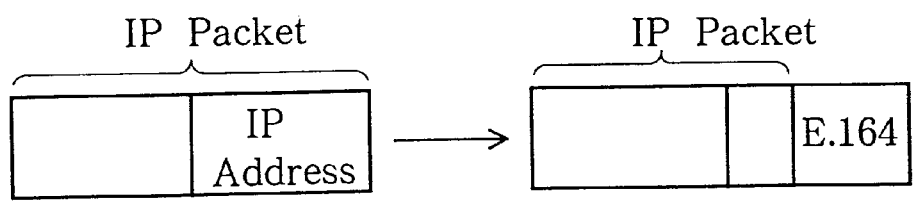
FIG. 9 shows the signal format of an IP packet and of the signal transmitted in the STM network.
Figure 10:
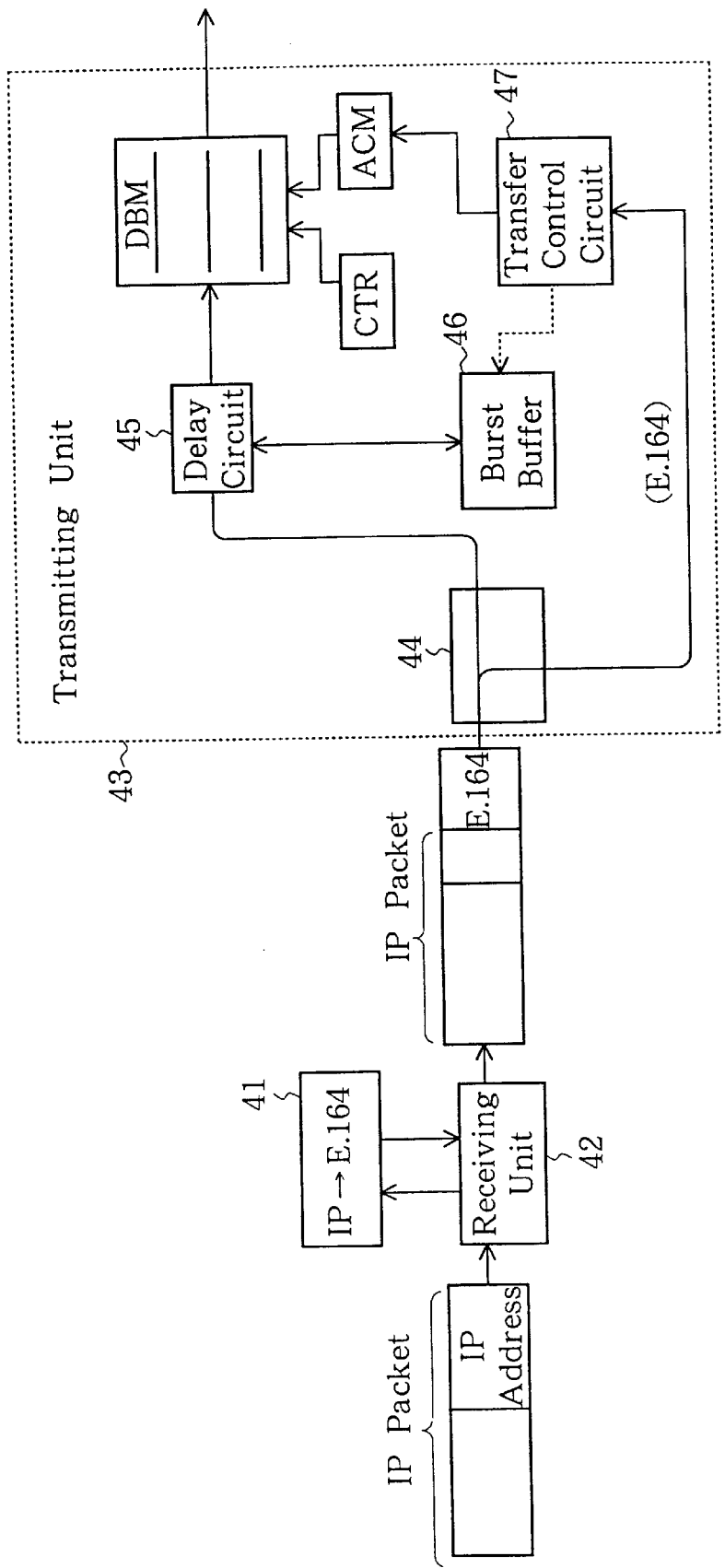
FIG. 10 is an exemplary block diagram of a local switch.
Figure 11:
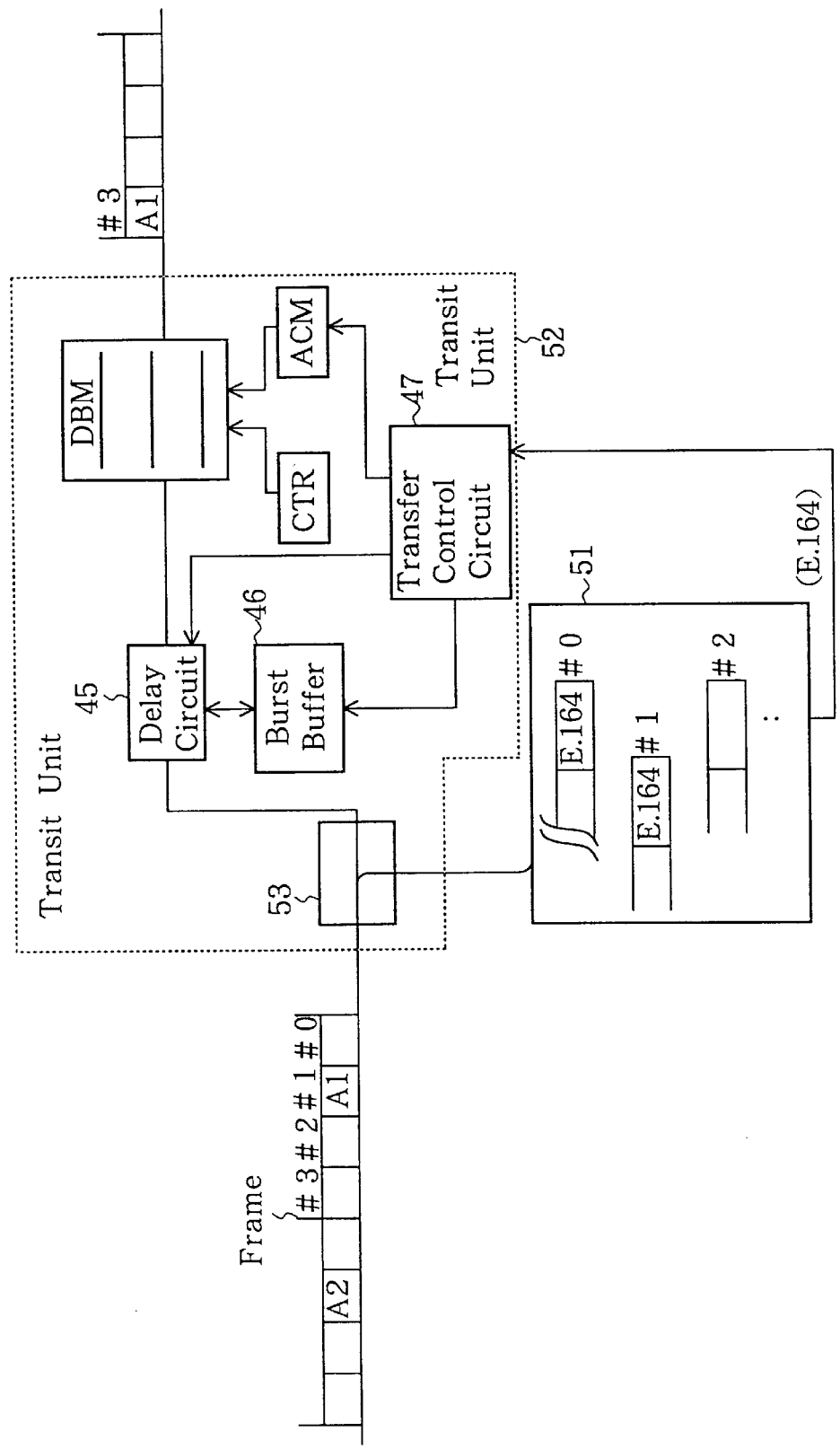
FIG. 11 is an exemplary block diagram of a transit switch.

FIG. 9 shows an example of the relation between the signal format of an IP packet from a terminal and the signal format of the signal which a local switch transmits to the STM network. When a local switch receives an IP packet from a terminal which it serves, it adds to the header the E.164 address corresponding to the IP address in the header of that IP packet, and transfers the resulting packet to the STM network in time slots corresponding to this address. FIG. 10 and FIG. 11 are respectively exemplary block diagrams of a local switch and a transit switch which add an E.164 address to an IP packet header.

The local switch shown in FIG. 10 comprises: table 41 in which is recorded, for at least some of the terminals in the STM network, the correspondence between their IP address and E.164 address; receiving unit 42 for receiving IP packets arriving from terminals, each of the IP packets having a header in which an IP address has been written, and for reading from table 41 and adding to the packet header the physical address corresponding to this logical address (this receiving unit 42 is equivalent to burst data store 31 and control circuit 33 in FIG. 5); and transmitting unit 43 which refers to this added header and transfers the packet to the STM network in time slots corresponding to the E.164 address in question.

When receiving unit 42 receives an IP packet which has been transferred from a terminal, it refers to table 41 and adds to the packet header the E.164 address of the destination, the destination being indicated by the IP address given to that IP packet. After the packet has had this E.164 address added, it is input to transmitting unit 43.

Figure 1:
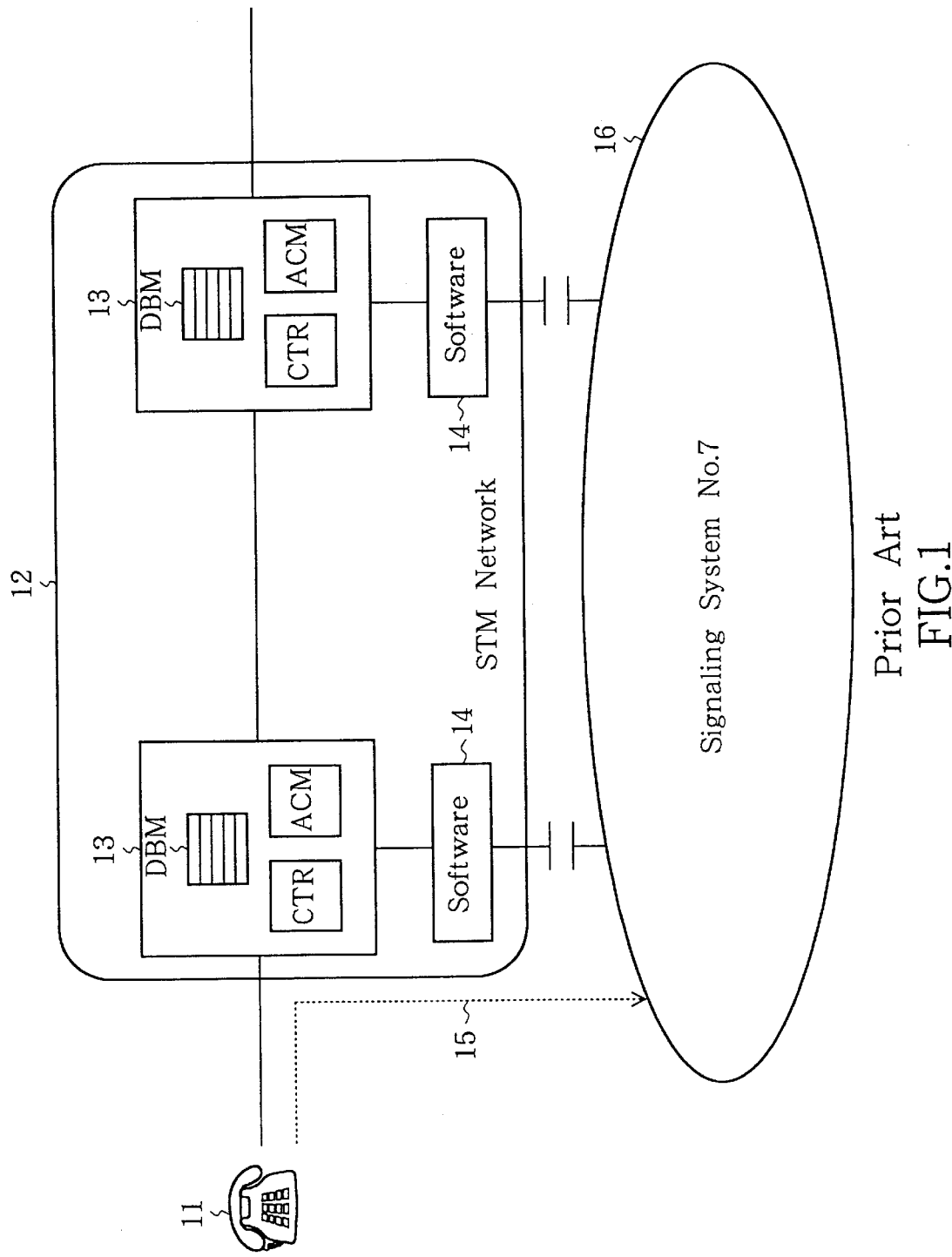
FIG. 1 is a block diagram of a conventional circuit-switched network.
Figure 2:
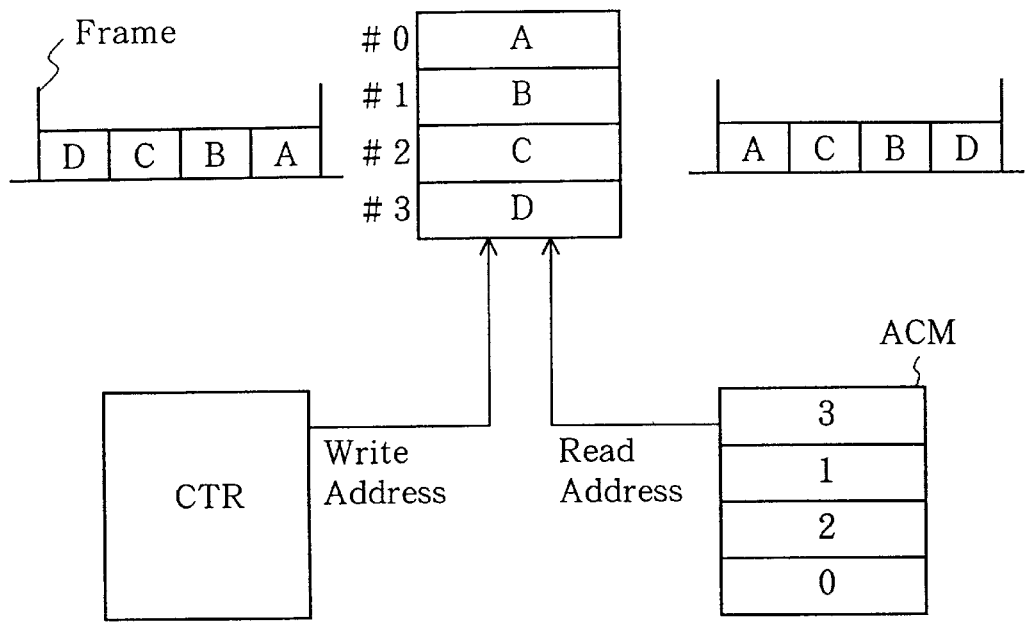
FIG. 2 is a block diagram of a conventional local switch.
Figure 3:
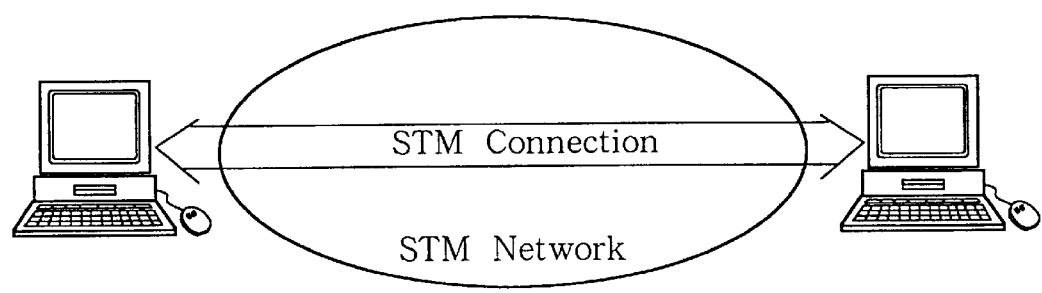
FIG. 3 is a schematic diagram of a conventional STM network.

Transmitting unit 43 comprises, in similar manner to the prior art example shown in FIG. 1, data buffer memory DBM, sequential counter CTR and address control memory ACM. It additionally, however, comprises header-copying unit 44, delay circuit 45, burst buffer 46 and transfer control circuit 47. Header-copying unit 44 copies and transfers to transfer control circuit 47 the E.164 address which has been written in the header of the input packet. Transfer control circuit 47 transfers data in accordance with this E.164 address, using the procedure explained with reference to FIG. 1. Delay circuit 45 compensates for the delay involved in the control performed by transfer control circuit 47 so that the packet is carried in the desired time slots. If there are no free time slots, burst buffer 46 temporarily stores the packet.

The transit switch shown in FIG. 11 comprises: header reference unit 51 which refers to the header from the packet written to the time slots, the header carrying an E.164 address; and transit unit 52 which, in accordance with the header found by header reference unit 51, relocates this packet in time slots corresponding to the E.164 address written in the header. Although the structure of transit unit 52 is approximately the same as that of transmission unit 43 of the local switch, there are the following differences. Namely, the transit unit 52 is provided with data-copying unit 53 instead of header-copying unit 44; data copied by this data-copying unit 53 is supplied to header reference unit 51; and an E.164 address is supplied from header reference unit 51 to transfer control circuit 47.

Data-copying unit 53 copies the packets written in the various time slots and inputs these to header reference unit 51. Header reference unit 51 virtually regenerates the input packets and is thereby able to retrieve the headers contained in these packets, the headers having E.164 addresses written in them. The retrieved E.164 addresses are transferred to transfer control circuit 47. The subsequent operation of the transit switch is the same as the operation of transmitting unit 43 of the local switch.

Because an E.164 address is read from the packet in this way by the transit switch and the packet is relocated in prescribed time slots, it is unnecessary to have a dedicated circuit set up in advance. Instead, each time a transit switch receives a packet it determines the time slots in which it will place the packet at that point in time. This enables data to be transferred on a link-by-link basis as simply and easily as in data communications based on the IP architecture mentioned above. A circuit is therefore held only during data transfer and is released when the transfer is completed.

Furthermore, links can be established rapidly, and network resources are occupied only during data transfer. During other times they can be released.

In comparison, in data transfer by ATM, one cell is 53 bytes of which 5 bytes are overhead, whereas such overhead is not required in the present invention. Moreover, because there are no problems of jitter and no cell loss, it is easy to assemble packets at the receiving side.

It is not practical to record in advance in each switch the correspondence between the IP address and E.164 address of all the terminals in an STM network. It is therefore preferable to provide a database in the STM network so that when burst data arrives at a local switch and the data has an IP address which is not recorded in table 41 of that switch, the E.164 address corresponding to that IP address can be queried. An example of the constitution of such an STM network is given in FIG. 12.

Figure 12:
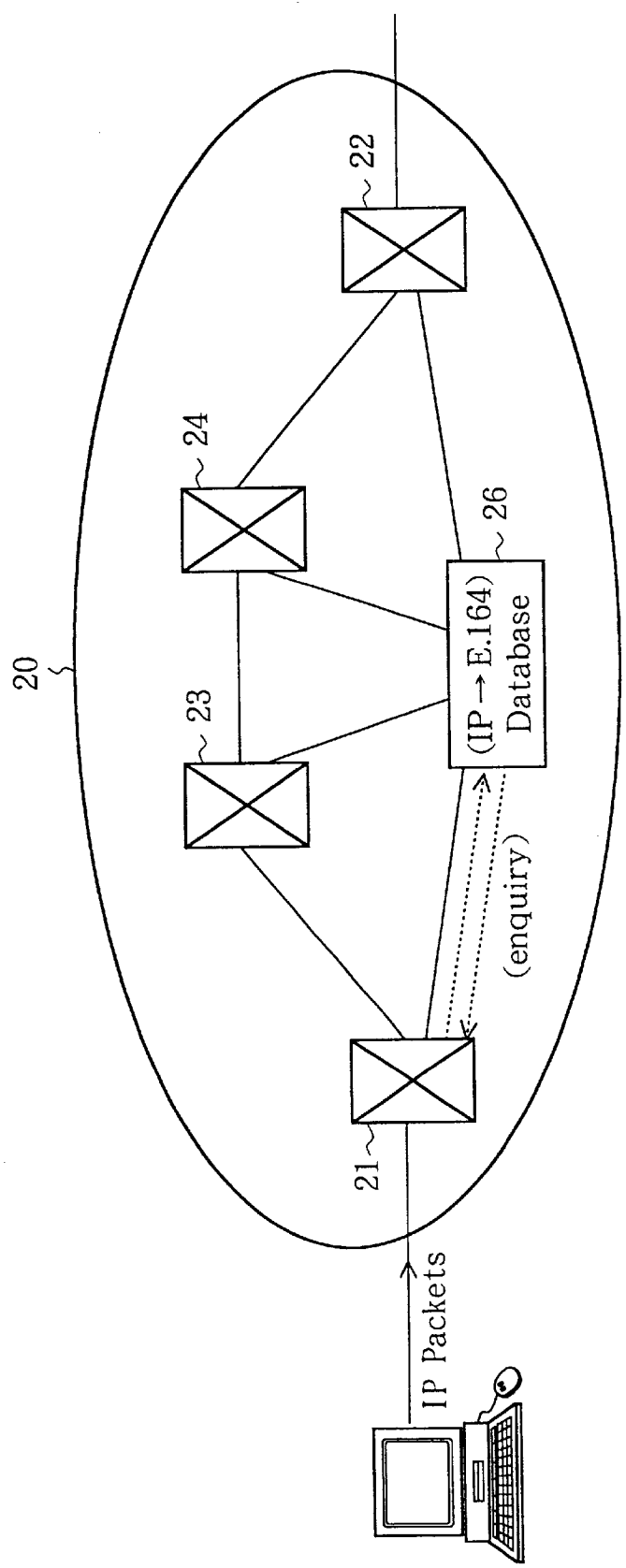
FIG. 12 shows an embodiment of a circuit-switched network provided with a database in the STM network in which are recorded E.164 addresses corresponding to IP addresses.

As in the network illustrated in FIG. 4, STM network 20 shown in FIG. 12 comprises local switches 21 and 22 and transit switches 23 and 24. Additionally, however, it comprises database 26 in which are recorded E.164 addresses corresponding to IP addresses. Further, STM network 20 in FIG. 12 is shown as one in which local switches 21 and 22 are connected via two transit switches 23 and 24.

Assuming that local switch 21 is the source, when a packet with an IP address that is not recorded in table 41 has arrived, receiving unit 42 (see FIG. 10) in this local switch 21 queries database 26 regarding the E.164 address which corresponds to this IP address. Receiving unit 42 also records in table 41 the data resulting from this query, the data arriving from database 26. If there is no spare capacity in table 41, the data which has been recorded in table 41 for the longest time is replaced by the data resulting from the query. Table 41 and database 26 are constituted from associative storage memory.

Figure 13:
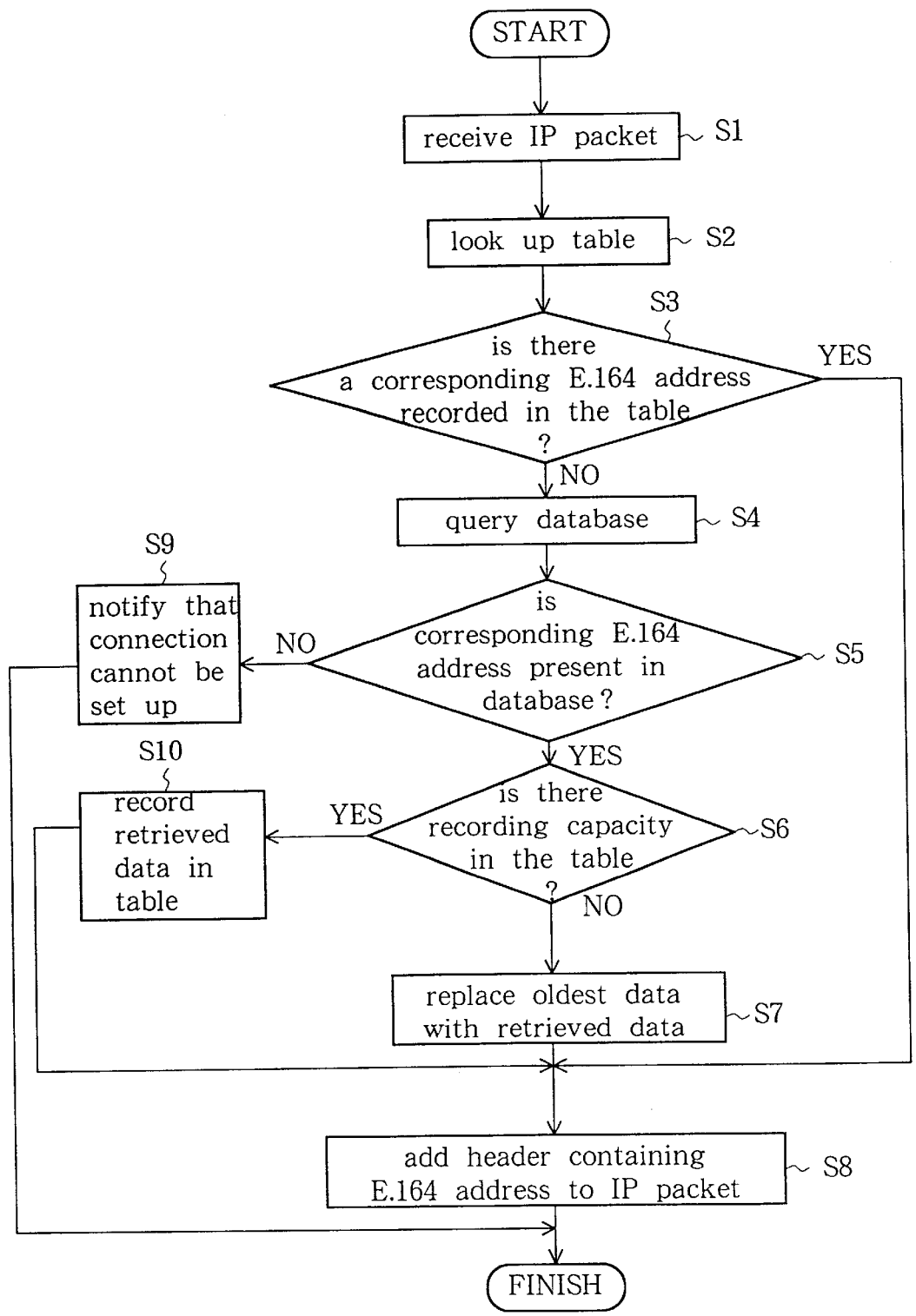
FIG. 13 is a flowchart showing the operation of a receiving unit.

FIG. 13 is a flowchart serving to explain the operation of receiving unit 42. When receiving unit 42 receives an IP packet (S1), it uses the IP address of this packet to look up table 41 and search for the E.164 address of the local switch which serves the terminal with that IP address (S2). If an E.164 address corresponding to this IP address is recorded in table 41 (S3), receiving unit 42 reads that E.164 address, puts it in a header, and adds that header to the packet (S8).

However, if an E.164 address corresponding to that IP address has not been recorded in table 41 (S3), database 26 is queried for an E.164 address corresponding to that IP address (S4). If it is found that an E.164 address corresponding to that IP address is present in database 26 (S5), receiving unit 42 receives the data retrieved from the database. If table 41 has spare capacity for recording the retrieved data (S6), receiving unit 42 records the retrieved data in table 41 (S10). Receiving unit 42 then adds a header containing the E.164 address to the packet (S8).

If data retrieved from database 26 is received, and there is no spare capacity for recording this data in table 41 (S6), the oldest data recorded in table 41 is replaced with the retrieved data (S7). Receiving unit 42 then adds a header containing the E.164 address in question to the packet, in accordance with this table 41 (S8).

If no E.164 address corresponding to the IP address in question is present even in database 26 (S5), receiving unit 42 notifies the terminal that a connection cannot be set up (S9).

Table 41 and database 26 preferably comprise associative storage memory. The use of associative storage memory facilitates rapid retrieval. Associative storage memory means memory from which data can be retrieved by using content as a key. In the present case, in order to extract the contents of an entry which has an IP address and an E.164 address as its fields, the IP address is used as a key.

By substituting the retrieved data received from database 26 for the oldest data in table 41, the data recorded in table 41 will be the E.164 addresses corresponding to frequently used IP addresses. This increases the usefulness of table 41.

If database 26 is extremely large, it can be divided into a plurality of databases defined in terms of the upper n bits by creating a hierarchy of IP addresses at some suitable level.

In the foregoing embodiment, control information containing signals for establishing STM connections was transferred by means of a signaling system No.7 network. However, as an alternative, some of the time slots of the frames in the STM network can be utilized on a fixed basis to transfer such control information. An embodiment of this sort will be explained below.

Figure 14:
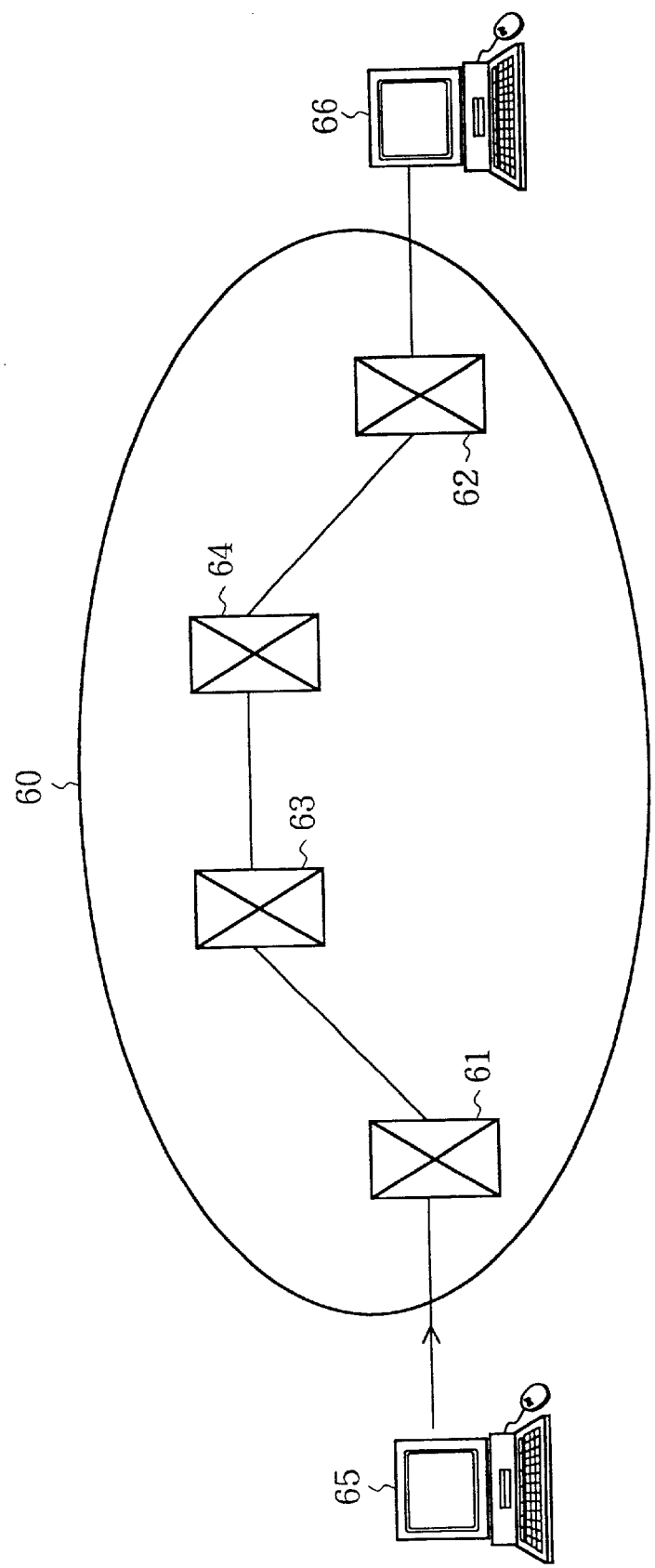
FIG. 14 shows an embodiment of a circuit-switched network wherein some of the time slots of the STM frames are utilized for transferring control information.
Figure 15:
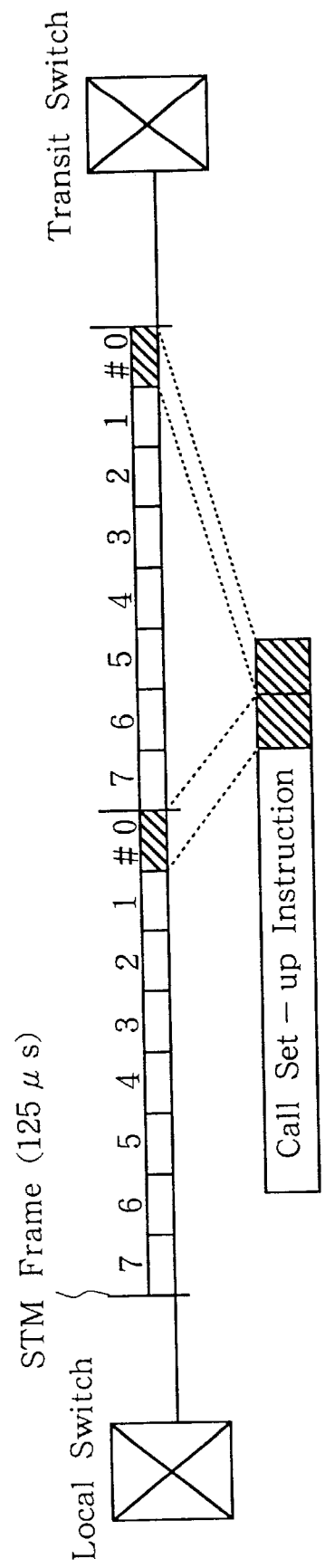
FIG. 15 is an exemplary block diagram of the STM frames used in this embodiment.

FIG. 14 shows in simplified form the overall constitution of a circuit-switched network, and FIG. 15 is an exemplary block diagram of the STM frames used in this embodiment This embodiment comprises local switches 61 and 62 and transit switches 63 and 64 in STM network 60, but a signaling system No.7 network of the sort illustrated in both FIG. 1 and FIG. 4 is not provided. Instead, as shown in FIG. 15, some of the time slots of the frames which constitute the units of data transfer in STM network 60 are utilized on a fixed basis Namely, in each 125 ms STM frame comprising multiplexed 8-byte time slots, the frame being used to transfer data between local switches and transit switches (in FIG. 15, from a local switch to a transit switch), the leading time slot is used as a control channel.

Figure 16:
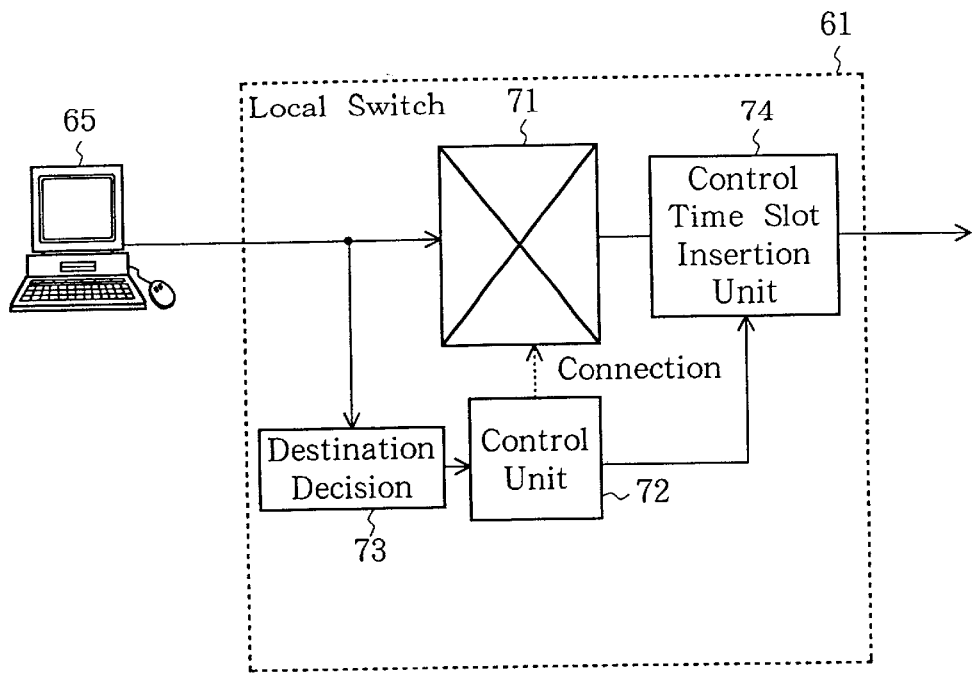
FIG. 16 is a block diagram of the main parts of a local switch serving a source terminal.
Figure 17:
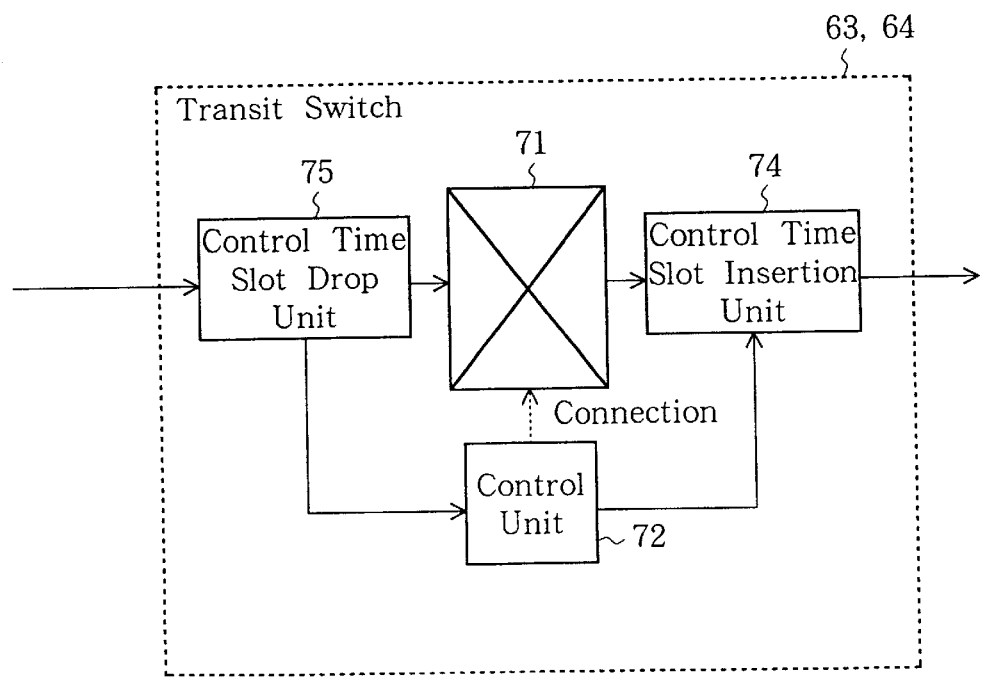
FIG. 17 is a block diagram of the main parts of a transit switch.
Figure 18:
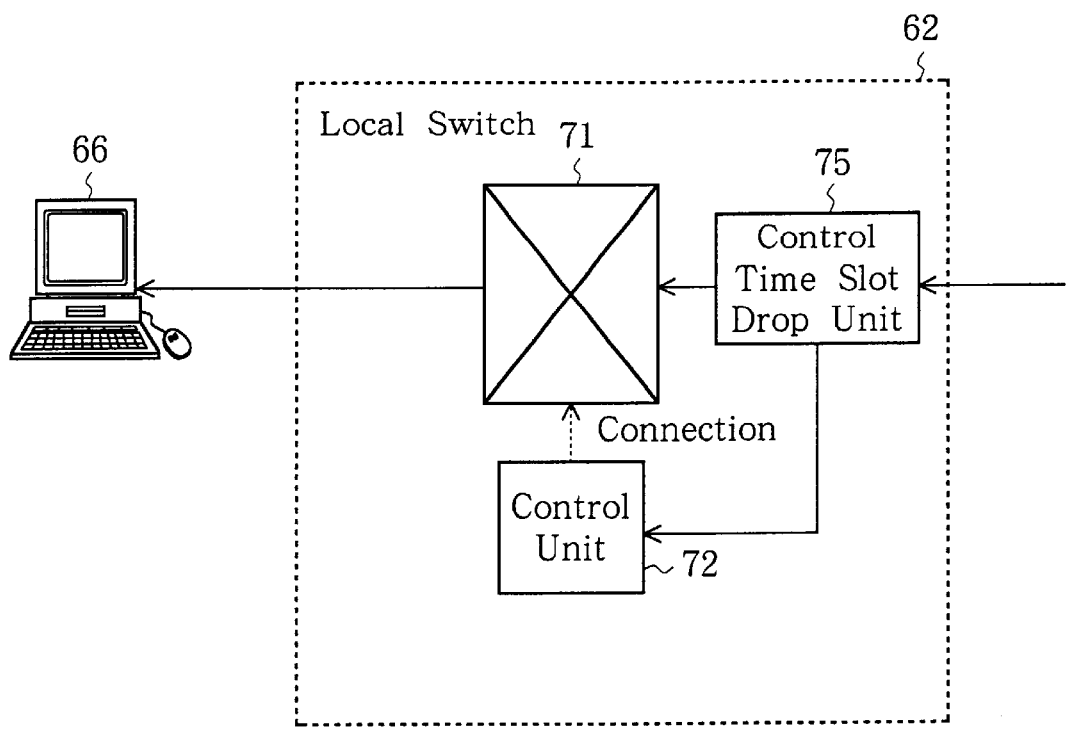
FIG. 18 is a block diagram of the main parts of a local switch serving a destination terminal.

FIG. 16 to FIG. 18 are respectively exemplary block diagrams of local switch 61 serving a source terminal, transit switches 63 and 64, and local switch 62 serving a destination terminal. In reality, there is no difference in the configurations of source side local switch 61 and destination side local switch 62, and the configurations shown in FIG. 16 and FIG. 18 are in practice provided collectively in a single local switch. In these figures, however, in order to make the explanation easier to understand, only the parts which are essential for the operation of the respective switches are shown. Furthermore, although FIG. 17 shows a transit switch as processing the flow of data in one direction, in practice the same configuration is provided in both directions.

Local switches 61 and 62 and transit switches 63 and 64 each comprise switching unit 71 for performing connection control by changing the position of the time slots carrying the time division multiplexed data, and control unit 72 for controlling this switching unit 71. Source side local switch 61 also comprises destination decision unit 73 which decides the destination of the connection request from a terminal served by the switch.

One of the significant features of this embodiment are that prescribed time slots are allocated on a fixed basis as control information channels between local switches 61 and 62 and transit switches 63 and 64; local switch 61 and transit switches 63 and 64 are each provided with control time slot insertion unit 74 for inserting control information into these prescribed time slots; and transit switches 63 and 64 and local switch 62 are each provided with control time slot drop unit 75 for extracting control information from the aforesaid prescribed time slots and setting it in control unit 72.

In source side local switch 61, destination decision unit 73 receives a connection request arriving from terminal 65 and decides the destination. It then forms control information for connecting terminal 65 to the decided destination and sets this control information in control unit 72. Control unit 72 performs its own connection control and selects the next switch in accordance with this control information. Control time slot insertion unit 74 inserts the control information in the aforesaid prescribed time slots and transfers it to this next switch, which is transit switch 63.

The respective control units 72 of transit switches 63 and 64 perform their own connection control and select the next switch in accordance with the control information extracted by control time slot drop unit 75. Control time slot insertion unit 74 inserts the control information in the aforesaid prescribed time slots and transfers it to this next switch.

Control unit 72 of destination side local switch 62 performs its own connection control in accordance with the control information extracted from control time slot drop unit 75, and transfers the data from the source terminal to destination terminal 66.

In this embodiment of the invention it has been supposed that the aforesaid time division multiplexed data is an IP packet and that this IP packet is a voice multiplexed signal.

Figure 19:
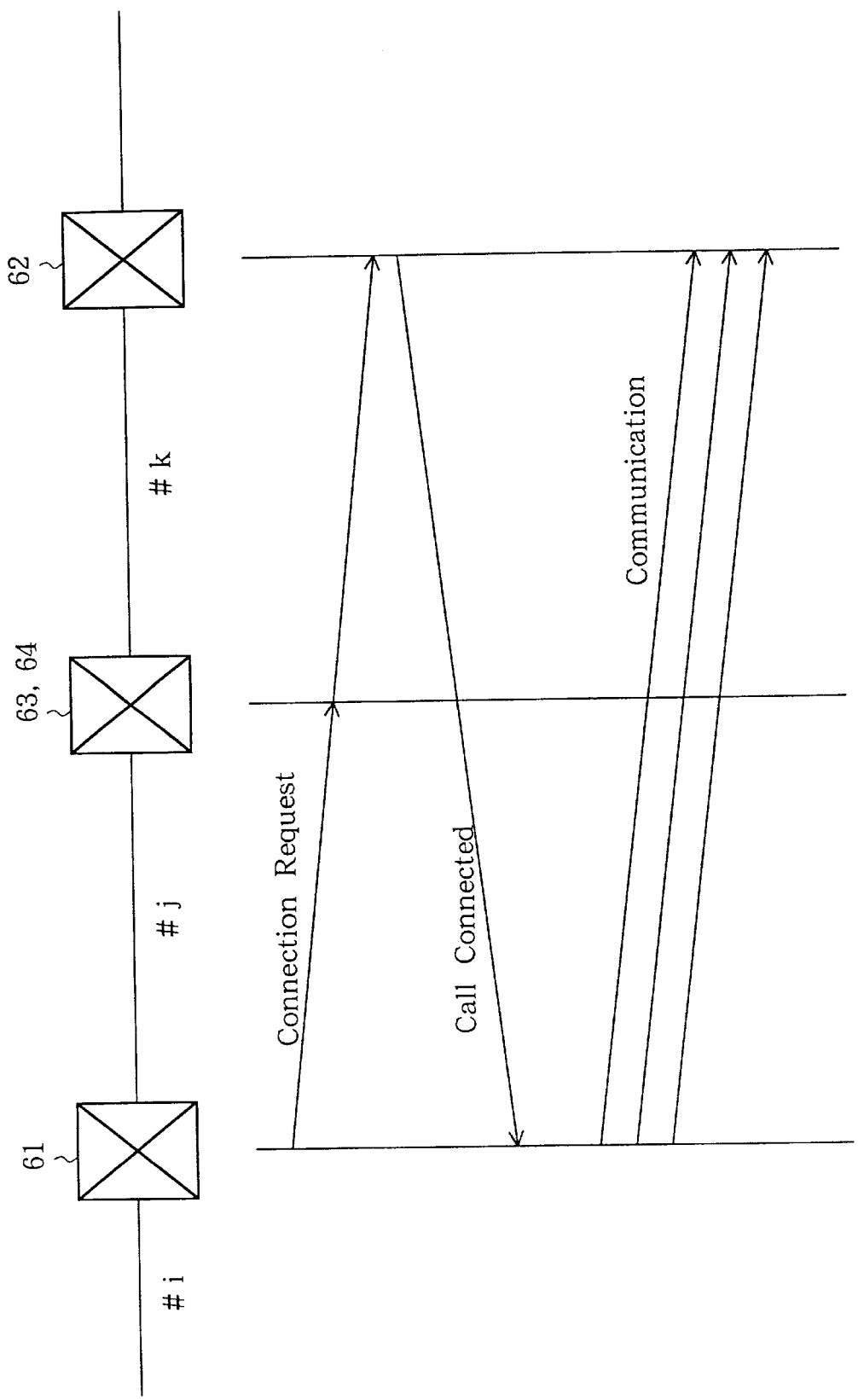
FIG. 19 is a timing chart of the communication procedure.

FIG. 19 is a timing chart of the transmission procedure according to this embodiment. Destination decision unit 73 of source side local switch 61 receives dial pulse or tone dialing signals from terminal 65 and decides the destination. It then forms control information in accordance with the result of this decision, the destination being written in this control information.

This control information is set in control unit 72. Control unit 72 controls switching unit 71 so that data from terminal 65 is transferred to the desired destination in accordance with this control information. Control unit 72 also selects the next transit switch 63 in accordance with this control information, which will be transferred to this next switch. Next, it sets the control information in control time slot insertion unit 74. Control time slot insertion unit 74 inserts the control information in time slots dedicated to control information, these time slots being shown in FIG. 15, and transfers them to transit switch 63.

In transit switch 63, to which the control information has been transferred by time slots dedicated to control information, control time slot drop unit 75 extracts the control information which has been inserted in the time slots dedicated to control information. This control information is then set in control unit 72. Control unit 72 obeys this control information and controls switching unit 71 so that data which has come from terminal 65 via local switch 61 is transferred to the desired destination. Control unit 72 also selects the next transit switch 64 for transferring the control information to, in accordance with the control information. It then sets this control information in control time slot insertion unit 74. Control time slot insertion unit 74 inserts the control information in time slots dedicated to control information, these time slots being shown in FIG. 15, and transfers them to the next switch, which is transit switch 64.

The same processing is performed by transit switch 64 as well. In local switch 62, to which the control information has been transferred by time slots dedicated to control information, control time slot drop unit 75 extracts the control information which has been inserted in the time slots dedicated to control information. This control information is then set in control unit 72. Control unit 72 obeys this control information and controls switching unit 71 so that the data from terminal 65 is transferred to terminal 66.

In this way, a connection request contained in control information is transferred from source side local switch 61 to destination side local switch 62 via transit switches 63 and 64. In this process, local switch 61, transit switches 63 and 64, and local switch 62 each performs connection control for the communication. When connection control relating to this connection request is completed, a notification to this effect is transferred from destination side local switch 62 to source side local switch 61, the notification being contained in control information. When source terminal 65 receives this connection completion notification, it begins communicating with destination terminal 66. In the foregoing processing, the information contained in the connection request can be either an E.164 address in STM network 60, or information indicating the position of the time slots.

As explained above, because the present invention can transfer burst data, and in particular IP packets, through an STM network, the burst data having been transmitted from a terminal on the basis of a logical address of the sort used in data transmission, it enables an STM network to be operated more dynamically than it can be when the data transfer is based on the leased circuit idea.

Moreover, because data are transported through an STM network, both delay and overhead are slight. In this connection, one ATM cell comprises 53 bytes of which 5 bytes are overhead, leading to the possibility of increased cost, whereas the utilization of STM means that such overhead is unnecessary.

Furthermore, if control information is transferred in some of the time slots of each frame, it is unnecessary to provide a common channel signaling network for controlling data transfer, and an STM network can be constructed in which there is no delay due to the common channel signaling network.

What is claimed is:

1. A circuit-switched network, in an STM (Synchronous Transfer Mode) network comprising:
    a plurality of local switches each serving at least one terminal, and
    at least one transit switch connected between said plurality of local switches;
    wherein logical addresses for sending and receiving burst data between the terminals of said plurality of local switches are allocated to at least some of the terminals; and
    each of said local switches comprises:
        a receiver configured to receive said burst data which has been given a logical address and which arrives from said at least one terminal served by that said local switch;
        a first device configured to manage the logical addresses of each of the at least one terminal served by that said local switch;
        a second device configured to acquire time slot information which has been allocated with respect to said STM network to the local switch which serves the at least one terminal forming a destination of said burst data, the allocated time set information having been carried out in accordance with the logical address of said received burst data; and
        a third device configured to transfer the burst data through the STM network in accordance with the time slot information obtained by said second device.

2. A circuit-switched network according to claim 1, wherein the second device comprises:
    a fourth device configured to transfer information relating to them logical address of said received burst data to another of said local switches; and
    a fifth device configured to return the time to slot information allocated to this local switch to the local switch which is a source of that logical address information when logical address information is received from said another of said local switches and the logical address concerned is a logical address managed by the local switch to which the second device belongs.

3. A circuit-switched network according to claim 1, wherein:
    STM connections are set up in advance between the plurality of local switches;
    said network further comprises a table, in which is recorded the time slot information corresponding to said STM connections; and
    the second device acquiring the time slot information by looking up said table.

4. A circuit-switched network according to claim 3, wherein each local switch comprises a monitor configured to monitor, for each said STM connections, whether that STM connection is busy or not, and configured to release any of said STM connections which has not been used for more than a set time.

5. A circuit-switched network according to claim 1, wherein each local switch comprises:
    a table configured to record the correspondence between the logical addresses of said at least one terminal, and the physical addresses allocated in advance to these terminals for purposes of routing in the STM network, for at least some of the terminals for which logical addresses have been allocated for sending and receiving said burst data within the STM network;
    a fourth device arranged to read from the table the physical address received from a terminal served by the local switch to which said fourth device belongs, said burst data to which the logical address of said destination has been given, and adds it to the header of the burst data; and
    a unit arranged to refer to said added header and arranged to transfer the burst data to the STM network in time slots corresponding to said physical address.

6. A circuit-switched network according to claim 5, wherein a transit switch a reader for referring to the header of the burst data written in said time slots and for reading its physical address and a relocation unit for relocating the burst data in the time slots corresponding to said physical address in accordance with the read physical address.

7. A circuit-switched network according to claim 6, wherein a transit switch further comprises a memory unit configured to temporarily store the burst data if there are no free time slots corresponding to the read physical address until such free time slots are available.

8. A circuit-switched network according to claim 5, wherein:

the STM network comprises a database in which is recorded the logical address of each of said terminals and the physical address corresponding thereto; and each of local switches further includes a query device which queries the database for the physical address corresponding to the non-recorded logical address when said burst data arrives bearing a logical address which is not recorded in the table of that said local switch.

9. A circuit-switched network according to claim 8, wherein the query device comprises:

a recorder which records in the table the data resulting from the query, said data arriving from the database, and a control unit configured to replace the data which has been recorded in the table for the longest time with the data resulting from the query if there is no spare capacity in the table when the recorder records the data resulting from the query table.

10. A circuit-switched network according to claim 8, wherein the table and the database are comprised of associative storage memory.

11. A circuit-switched network according to claim 1, wherein in order to transfer, between one of said local switches and one of said transit switches, control information containing signals for establishing STM connections, some of the time slots of each frame are allocated on fixed basis, a frame being the unit of data transfer in the STM network.

12. A circuit-switched network according to claim 11, wherein each of said local switches and each of said transit switches comprises:

an inserter arranged to take prescribed time slots as the control channel and to insert control information in said prescribed time slots;

an extractor arranged to extract said control information from said prescribed time slots; and a controller for performing connection control in accordance with the extracted control information.

13. A circuit-switched network according to claim 12, wherein:

each of said local switches further comprises a receiver configured to receive a connection request arriving from said at least one terminal which the switch serves, and to decide the destination of the connection requested by that said one terminal, and a unit arranged and configured to form and set control information in the controller for connecting said one terminal to the destination decided by the receiver;

the controller includes a self-controller for performing self-controlled connection control and for selecting the next of said local switches in accordance with the control information which has been set by the setting unit; and the inserter inserts the set control information in the prescribed time slots when a local switch to which it belongs is a source, thereby transferring it to the selected next of said local switch.

14. A circuit-switched network according to claim 12, wherein each local switch further comprises a self-controller arranged to perform self-controlled connection control in accordance with the control information when the extractor has extracted said control information which has been transformed from a source side local switch.

15. A circuit-switched network according to claim 12, wherein:

each transit switch further comprises a self-controller for performing self-controlled connection control and for selecting the next of said local switches in accordance with control information which has been extracted by the extractor; and the inserter of each transit switch inserts said control information in the prescribed time slots and thereby transferring it to the selected next local switch.

16. A circuit-switched network according to claim 1, wherein the burst data comprises voice multiplexed signals.

* * * * *